(12) United States Patent
Cline et al.

(10) Patent No.: US 8,097,130 B2
(45) Date of Patent: Jan. 17, 2012

(54) INTEGRATED WATER TREATMENT SYSTEM

(75) Inventors: David J. Cline, Newport Beach, CA (US); Gregory G. Koerber, Norco, CA (US)

(73) Assignee: Balboa Instruments, Inc., Tustin, CA (US)

( * ) Notice: Subject to any disclaimer, the term of this patent is extended or adjusted under 35 U.S.C. 154(b) by 1375 days.

(21) Appl. No.: 11/550,773

(22) Filed: Oct. 18, 2006

(65) Prior Publication Data

US 2008/0093225 A1 Apr. 24, 2008

(51) Int. Cl.
*C25B 9/00* (2006.01)
*C02F 1/461* (2006.01)

(52) U.S. Cl. ............... 204/229.4; 204/229.6; 204/229.7; 204/278.5

(58) Field of Classification Search ............... 204/229.4, 204/229.6, 229.7, 278.5
See application file for complete search history.

(56) References Cited

U.S. PATENT DOCUMENTS

| | | | | |
|---|---|---|---|---|
| 6,638,413 | B1* | 10/2003 | Weinberg et al. | 205/637 |
| 6,780,306 | B2* | 8/2004 | Schlager et al. | 205/701 |
| 2006/0137996 | A1 | 6/2006 | Mierswa | |

OTHER PUBLICATIONS

Balboa Direct, Users Guide & Installation Instructions for Economatic Models: ESC 16, 24, 36, 48, pp. 1-22, www.balboadirect.com.

* cited by examiner

*Primary Examiner* — Arun S Phasge
(74) *Attorney, Agent, or Firm* — Larry K. Roberts

(57) ABSTRACT

An integrated water treatment system for sanitizing the water in a water system and reducing scaling includes an electrolytic cell through which water is passed. An electronic control system is coupled to the electrolytic cell, to provide a drive current to the cell to generate a sanitizer by electrolysis. The control system applies a variable frequency alternating voltage drive to said cell to reduce scaling build-up in the system.

26 Claims, 6 Drawing Sheets

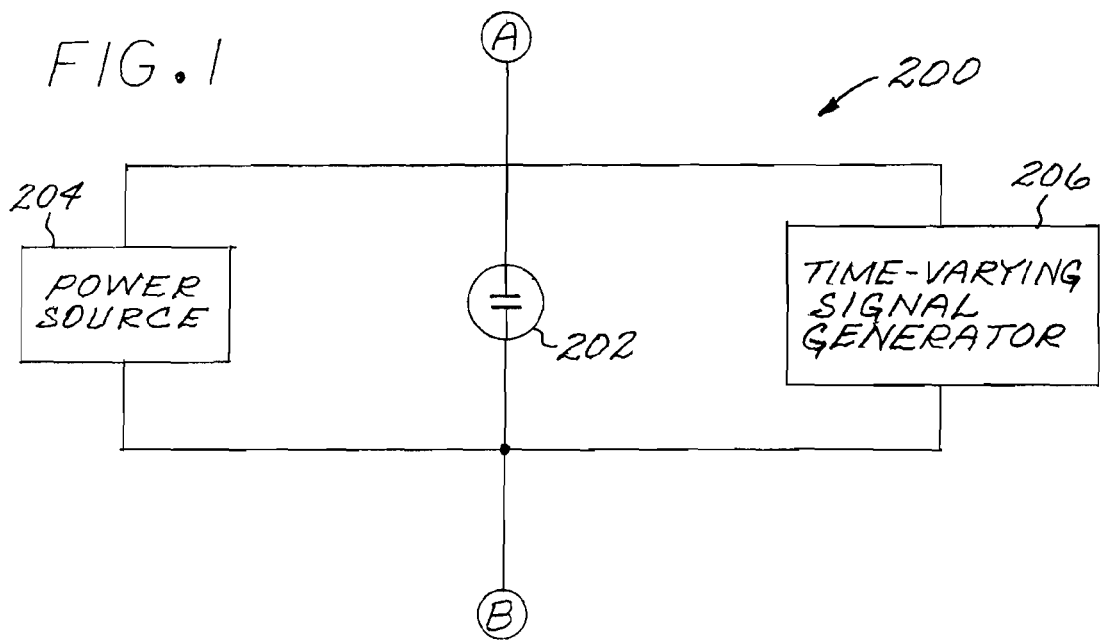
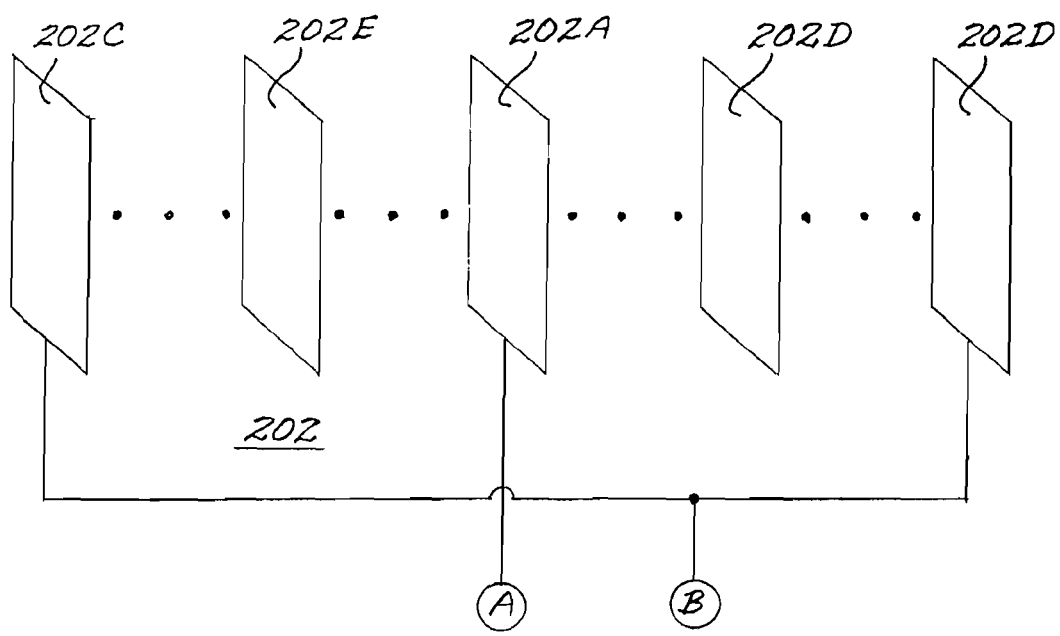

INTEGRATED WATER TREATMENT SYSTEM

BACKGROUND

Electrolytic cells can be used to generate a sanitizer, e.g., halogen, such as bromine or chlorine, for providing sanitizing water treatment in a body of water. For example, electrolytic cells may be used to sanitize swimming pools, fountains, spas, hot tubs and other bodies of water. The electrolytic cell may include plates mounted in a recirculating flow path for the body of water. The water has a dissolved electrolyte which when subjected to electrolysis is transformed into a sanitizer. For example, a salt such as sodium chloride may be dissolved in pool water. When subjected to electrolysis, the halogen (chloride) portion of the salt may be generated to form a sanitizer which has the ability to oxidize or kill bacteria, algae and other unwanted elements. Electrolytic cells are known in the art. One example is the ECOmatic™ system marketed by Balboa Direct.

Electrolytic cells may be susceptible to calcification scaling. Calcification or other scaling may also build up on other elements of a water system.

BRIEF DESCRIPTION OF THE DRAWINGS

FIG. 1 is a schematic block diagram of an exemplary embodiment of an integrated water treatment system.

FIG. 2 is a schematic diagram of an exemplary embodiment of an electrolytic cell.

DETAILED DESCRIPTION

Figure 3:
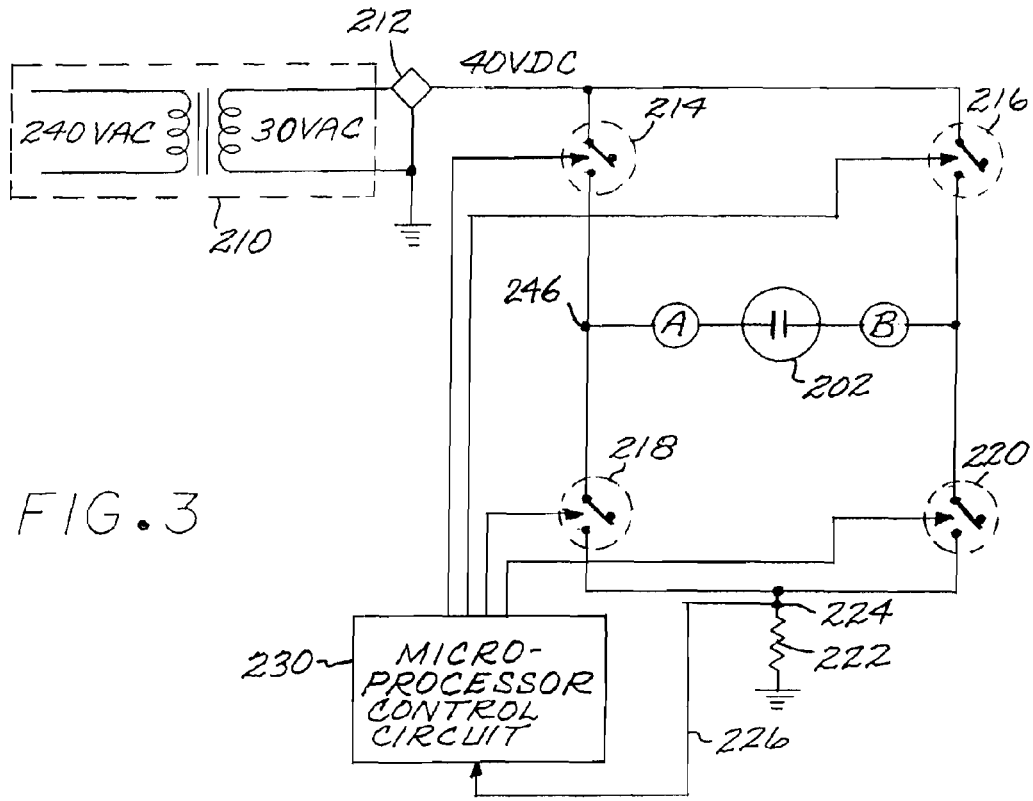
FIG. 3 is a schematic diagram illustrating aspects of an exemplary embodiment of an electrolytic sanitizer-generating system which may be included in the system of FIG. 1.

In the following detailed description and in the several figures of the drawing, like elements are identified with like reference numerals. The figures are not to scale, and relative feature sizes may be exaggerated for illustrative purposes.

An exemplary embodiment of an integrated water treatment system may be capable of electrolytic generation of a sanitizer, e.g. a halogen such as chlorine or bromine, from a conductive electrolyte in the water, and capable of reducing build-up of scaling by calcium compounds or other scale forming substances. Exemplary applications for the water treatment system include, but are not limited to, pools, spas, fountains, boilers, cooling towers, and ship ballast compartments.

FIG. 1 is a schematic block diagram of an exemplary embodiment of an integrated water treatment system 200. The system may include an electrolytic cell 202 through which the water is passed, a power source 204 and a time-varying signal generator 206. A sanitizer may be generated by electrolysis using a current applied to the cell by the power source 204. In addition to the generation of a sanitizer, the system may also condition the water by the application of a signal to the cell by generator 206 to prevent scaling build-up inside the cell and on associated hardware.

In an exemplary embodiment, the power supply 204 may function as a constant current source for the cell 202. The AC signal generator 206 may in an exemplary embodiment provide a variable frequency, low voltage signal applied to the cell 202.

In an exemplary embodiment, the electrolytic cell 202 may be a two terminal cell, with terminals A, B, constructed with multiple plates of a metal, such as titanium. The plates may typically be coated with a corrosion resistant material, such as, for example, rhuthenium dioxide, to prevent decomposition due to the electrolytic process. Additional plates may be added in parallel to increase the sanitizer output and improve the reliability of the cell. An exemplary electrolytic cell suitable for the purpose is described in application Ser. No. 11/294,181, entitled "Electrolytic Cell Assembly," filed Dec. 5, 2005, the entire contents of which are incorporated herein by this reference.

FIG. 2 is a schematic diagram of an exemplary embodiment of the cell 202, wherein one plate 202A is positioned centrally between outer plates 202B, 202C, and connected to terminal A. The outer plates 202B, 202C are connected to terminal B in this exemplary embodiment, and thus have opposite polarity from the polarity of terminal A. Additional plates, e.g. plates 202D, 202E may be positioned between the center plate and the outer plates, and are not connected to either terminal or to each other. This configuration is merely one example of a possible configuration for the cell. For example, the cell may employ single plates for each polarity.

In an exemplary embodiment, the electrolytic sanitizing generator function of the system 200 may be controlled by the closed loop application of current into the cell 202. FIG. 3 illustrates an exemplary embodiment of an electrical schematic of the electrolytic generator portion of the system 200. Input power from a typical AC power source (e.g., 120 Vac or 240 Vac) may be converted to a low voltage (e.g., 30 VAC) via a step-down transformer 210. This low AC voltage is rectified by rectifier circuit 212 to provide a DC voltage (e.g., 40 VDC) and applied to the cell 202 to drive an average direct current into the cell.

The application of current to the cell may be monitored and adjusted to remain substantially constant across varying water conditions or changes in the electrolyte in the water in the cell 202. In an exemplary embodiment, a controller 230 may monitor the current flow by sensing the voltage at node 224, e.g. by conductor 226 to an analog to digital converter comprising the controller 230. Periodically, or on a demand basis, the direction of the current may be reversed in order to clean deposits or contamination from the cell. This may be accomplished in an exemplary embodiment by switches 214, 216, 218, 220, under control of the controller 230. In an exemplary embodiment, the switches may be solid state devices, e.g. transistors. For current flow in a first direction through the cell, switches 214 and 220 may be set to a closed state, and switches 216 and 218 set to an open state. Current from the power supply will flow through switch 214, the cell 202, switch 220 and resistor 222 to a ground. To reverse the current flow direction, the switch states are reversed, so that current flows through switch 216, the cell 202, switch 218 and resistor 222 to ground.

In an exemplary embodiment, the control circuit 230 may include a microprocessor and associated control and support circuitry, with the microprocessor programmed to execute an algorithm to control the switches 214-220 to provide a variable pulse width modulated DC-to-DC constant current source function. Input power from a utility source such as 240 Vac 60 Hz power may be transformed by the transformer 210 to a low voltage, e.g. of approximately 30 VAC. The low voltage power may be rectified and filtered by circuit 212 to provide a constant DC voltage used to drive the cell and generate the sanitizer. The low voltage power may also be used to power the microprocessor and support circuitry.

In an exemplary embodiment, upon power-up, closed-loop application of constant current is controlled via the microprocessor-based controller 230, which increases the current applied to the cell until the monitored average current matches the requested or a set point current level. The controller 230 may achieve this by pulse width modulating the DC voltage applied to the cell. For example, say current is being passed from terminal A to terminal B by suitable setting of switches 216 and 218 to the open state, and switches 214 and 220 set to the closed position. The current through the cell may be pulse width modulated by opening and closing switch 214, under control of the control circuit 230. When conditions change in the electrolyte, the microprocessor detects an increase (or decrease) in the current passing through the cell, and adjusts the applied voltage to reduce (or increase) the current back to the desired level.

In an exemplary embodiment, water conditioning may be accomplished through the application of a AC signal waveform to the cell. In an exemplary embodiment, the AC signal waveform may be a switched, variable high frequency signal capacitively coupled to the cell. This high frequency signal may be connected to the cell along with the current source generating the sanitizer, resulting in a superposition of two signals. The superposition of signals may both generate sanitizer and reduce or substantially prevent scaling on the cell plates.

Figure 4:
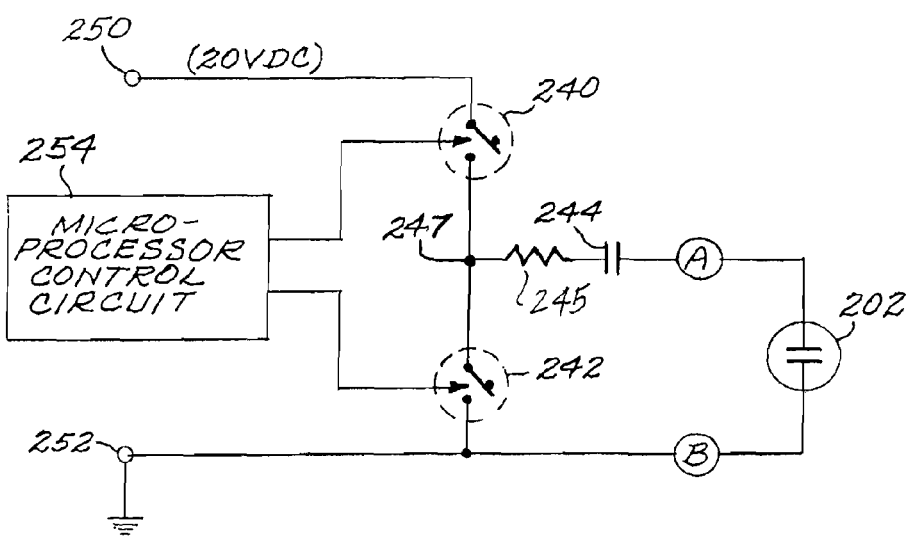
FIG. 4 is a schematic diagram illustrating aspects of an exemplary embodiment of a water treatment system which may be integrated into the system of FIG. 1.

FIG. 4 is a schematic diagram of an exemplary embodiment of a water conditioning system 206 of a water treatment system. An input power source, e.g. delivering in this example 20 VDC, is applied to the system 206 at node 250. Solid state switches 240 and 242 are connected in series to node 246, between the node 250 and node 252, connected to ground. A coupling capacitor 244 and resistor 245 connect node 246 to terminal A of the cell 202. Terminal B of the cell 202 is connected to node 252.

In an exemplary embodiment, a microprocessor-based control circuit 254 may generate a time-varying signal, e.g. a square wave or rectangular wave signal with a variable frequency greater than 1 Hz, e.g. in a frequency range from 1 Hz to 20 KHz or higher, by selective actuation of the solid state switches 240, 242. The generated signal waveform is capacitively coupled to the cell 202 by capacitor 244, which transfers charge stored in the capacitor into the cell in a short amount of time. The capacitively-coupled, time-varying signal applied to the cell 202 may reduce or prevent the build-up or scaling of deposits on the cell and associated components. Various waveforms may be employed for this purpose. One exemplary waveform is a variable frequency waveform wherein the frequency is slowly swept from about 3 KHz to about 5 KHz in a period of one minute, and then repeats.

In an exemplary embodiment, the control circuit 254 may control the switches 240, 242 to generate a square wave or rectangular wave signal waveform. By selectively opening and closing the switches, positive-going and negative-going waveform portions may be applied to the coupling capacitor 244. For example, by opening switch 240 and closing switch 242, node 247 is pulled down to the potential of a floating ground at node 252. Similarly, by opening switch 242 and closing switch 240, node 247 is pulled up to the potential of the power supply, e.g. 20 VDC at node 250. Repetition of this cycle will result in a rectangular wave signal waveform being applied to the coupling capacitor 244, which is series connected to the cell 202 (modeled as a capacitor). The microprocessor control circuit 254 may readily modify the duty cycle and frequency of the rectangular wave signal. The coupling capacitor 244 will filter the waveform applied to the electrolytic cell 202.

Figure 5A:
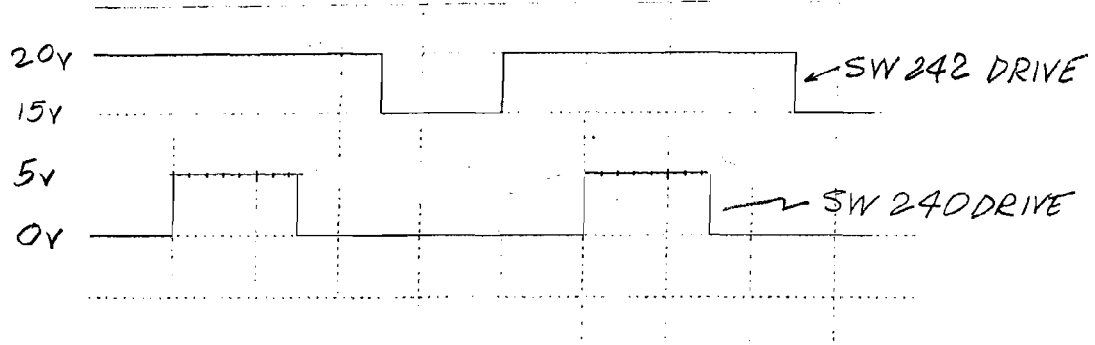
FIG. 5A illustrates an exemplary set of control signal waveforms applied to the control terminals of switches in a water treatment system.
Figure 5B:
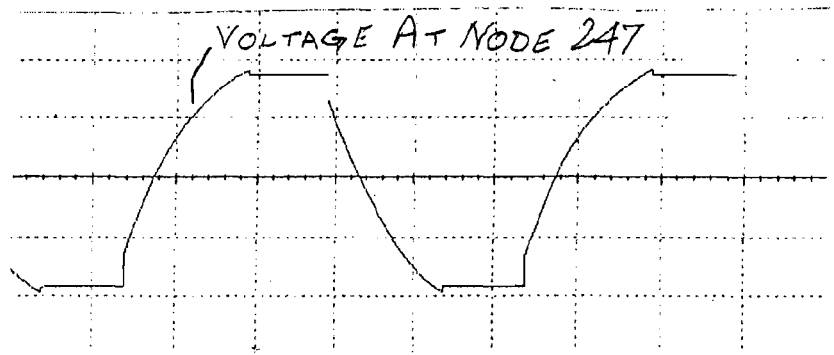
FIG. 5B illustrates an exemplary square wave waveform resulting from switch operation.
Figure 5C:
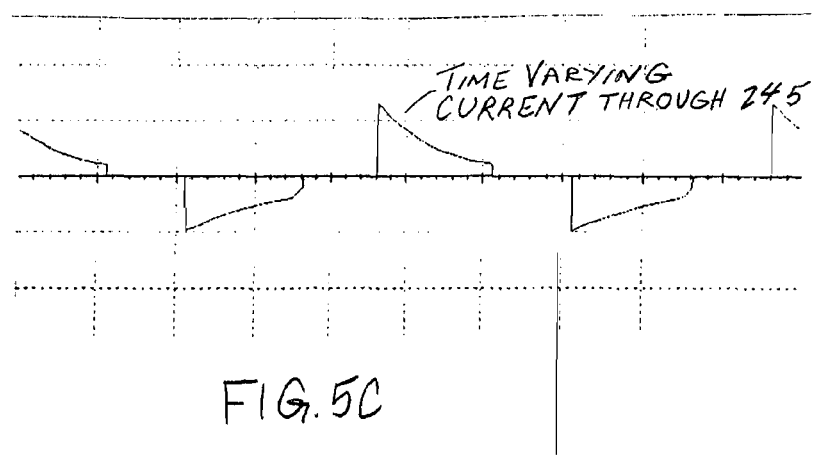
FIG. 5C shows an exemplary high frequency time-varying current applied to an electrolytic cell in the exemplary embodiment of FIG. 4.

Exemplary signal waveforms are depicted in FIGS. 5A-5C. FIG. 5A illustrates an exemplary set of control signal waveforms generated by the control circuit 254 and applied to the control terminals of switches 242 (top waveform) and 242 (bottom waveform). In this exemplary embodiment, the signal applied to the control terminal of switch 242 varies between 20 volts and 15 volts, and the signal applied to the control terminal of switch 240 varies between 0 volts and 5 volts. FIG. 5B illustrates an exemplary square wave waveform applied to node 247 by the switching of switches 240, 242. FIG. 5C shows an exemplary high frequency time-varying current through resistor 245 resulting from the drive signal of FIG. 5B.

Figure 5D:
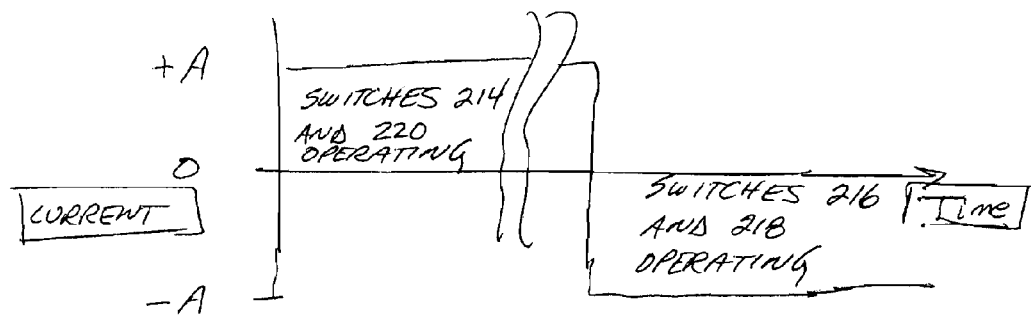
FIG. 5D illustrates an exemplary variable pulse width modulated DC-to-DC constant current drive applied to cell terminals for a sanitizing function.
Figure 5E:
FIG. 5E illustrates an exemplary composite drive signal applied to the cell terminals for sanitizing and water treatment functions.
Figure 6:
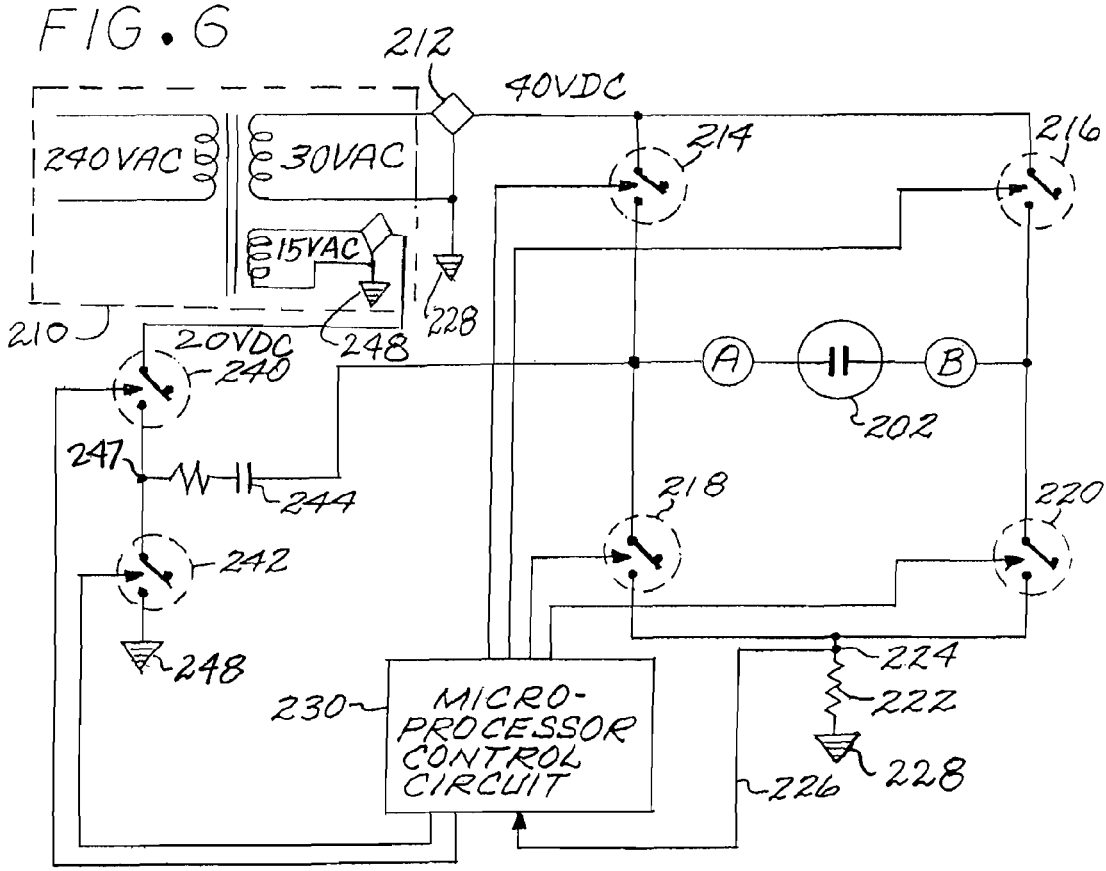
FIG. 6 is a schematic diagram of an exemplary embodiment of an integrated water treatment system with a common controller.

FIG. 6 is a schematic diagram of an exemplary embodiment of an integrated water treatment system with a common controller. Like numbered elements from the embodiments of FIGS. 3 and 4 are integrated together, to drive the cell 202 to generate a sanitizer through electrolysis, and to reduce or eliminate scaling buildup on the cell plates and other components of the water system. The microprocessor control circuit 260 is configured to carry out functions of both controllers 230 and 240 of the embodiments of FIGS. 3 and 4. It is noted that the ground connections 228, 248 for this exemplary embodiments are respective floating grounds, and are not connected to earth ground. The circuit 260 may apply a composite drive signal to the cell, which is the superposition of the drive signal for the sanitizing function and the high frequency time-varying signal for the treatment function. FIG. 5D illustrates an exemplary variable pulse width modulated DC-to-DC constant current drive applied to terminals A and B of the cell for the sanitizing function. FIG. 5E illustrates an exemplary composite drive signal applied to the cell terminals. The composite drive signal depicts an exemplary embodiment in which the polarity of the constant current component of the drive signal is reversed periodically or intermittently, e.g. every few hours or so.

Figure 7:
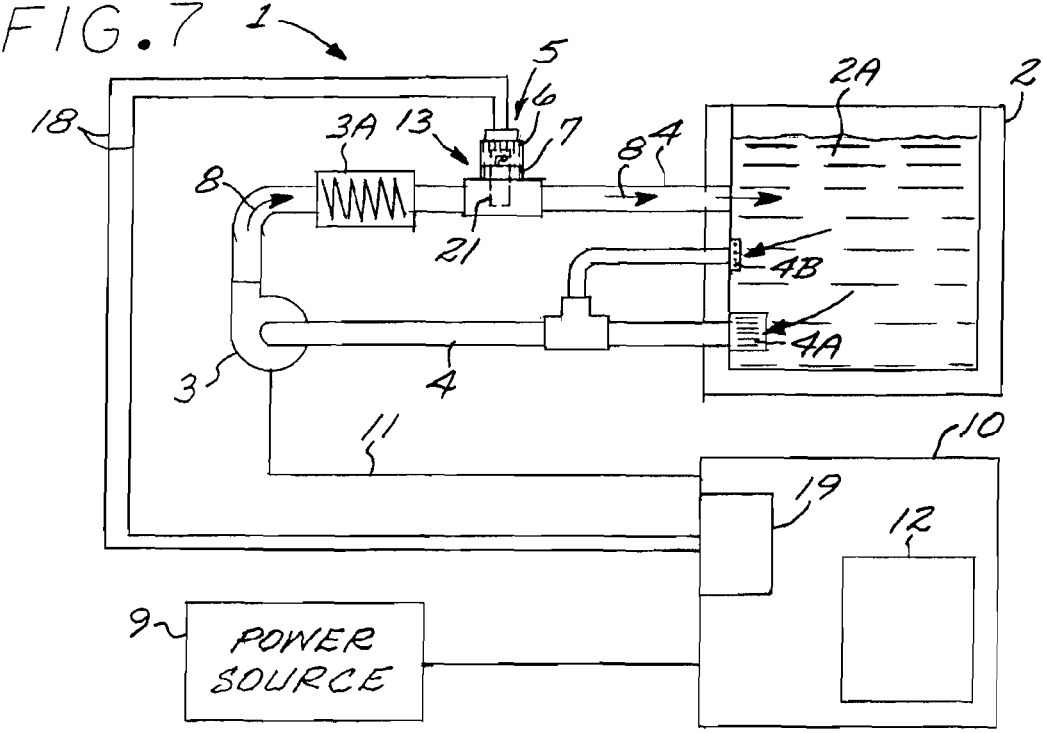
FIG. 7 illustrates an exemplary embodiment of a bathing installation such as a spa or pool system.

FIG. 7 illustrates an exemplary embodiment of a spa or pool system 1, which may include an integrated water treatment system. In an exemplary embodiment, a spa or pool system 1 may include a vessel 2 holding a body of water 2A. The spa or pool system 1 may also include a pump 3 for recirculating the water. In an exemplary embodiment, the pump 3 may draw water from the body of water 2A through a filter 4A and a secondary suction port 4B into a recirculating water flow line 4, and pump the water back into the body of water 2A through a discharge side of the recirculating water flow line 4. The filter may be located at various locations in the system 1, and is diagrammatically shown in FIG. 7. In an exemplary embodiment, the recirculating water flow line may be piping, for example PVC piping. A heat exchanger or heater 3A may be in the water flow line 4.

In an exemplary embodiment, the system 1 may include an electrolytic cell assembly 5. The electrolytic cell assembly 5 may include an electrolytic cell housing or electrode plate support 6 supporting electrode plate set 21, and a connection port or cell retainer 7 for detachably connecting the housing 6 to an opening in the flow line 4. The cell retainer 7 may include an opening fluidically connected to the flow path 8 through the flow line 4. In an exemplary embodiment, the cell retainer 7 may be attached to a tee 44 which is connected in the flow line 4. The electrode plate set 21 may extend through the cell retainer 7 and into the flow path 8 within the flow line 4. Operation of the electrolytic cell assembly 5, in an appropriate aqueous solution, may cause the generation of halogens, for example chlorine or bromine, thereby providing sanitizing water treatment for water moving along the flow path 8 through the flow line 4. The cell assembly 5 may also be operated to condition the water to reduce or eliminate scaling on components of the cell assembly and the spa or pool system 1. In an exemplary embodiment, the electrolytic cell assembly may be located on the flow line 4 on the discharge side of the pump 3. In another embodiment, the electrolytic cell assembly may be located on the flow line 4 on the intake side of the pump. The particular configuration of the exemplary electrolytic cell is described more particularly in co-pending application Ser. No. 11/294,181.

Referring again to FIG. 7, in an exemplary embodiment, the spa or pool system 1 includes a control system 10, which receives electrical power from an external power source 9, typically a line voltage at 120 VAC or 240 VAC. The control system 10 provides auxiliary power lines 11 to supply power at the appropriate voltage and current levels to operate and control various components of the spa or pool system 1, including for example the pump 3. Other typical components may include a water heater 3A and a light system. In an exemplary embodiment, the control system 10 includes an electrolytic cell drive circuit 19 which provides electrical power to drive the electrolytic cell 5 through lines 18. The control system 10 may include a microprocessor-based controller 12 which provides control signals and power to the electrolytic cell drive circuit 19. Alternatively, the drive circuit 19 may be a stand alone circuit which may interact with control system 10. The control system 10 and the drive circuit 19 collectively perform the functions of microprocessor control circuit 260 of FIG. 6, to perform the sanitizing and de-scaling functions. In an exemplary embodiment, the control system 10 may be programmed to activate the de-scaling function whenever the pump 3 is activated, and the de-scaling function is de-activated when the pump is off.

Figure 7A:
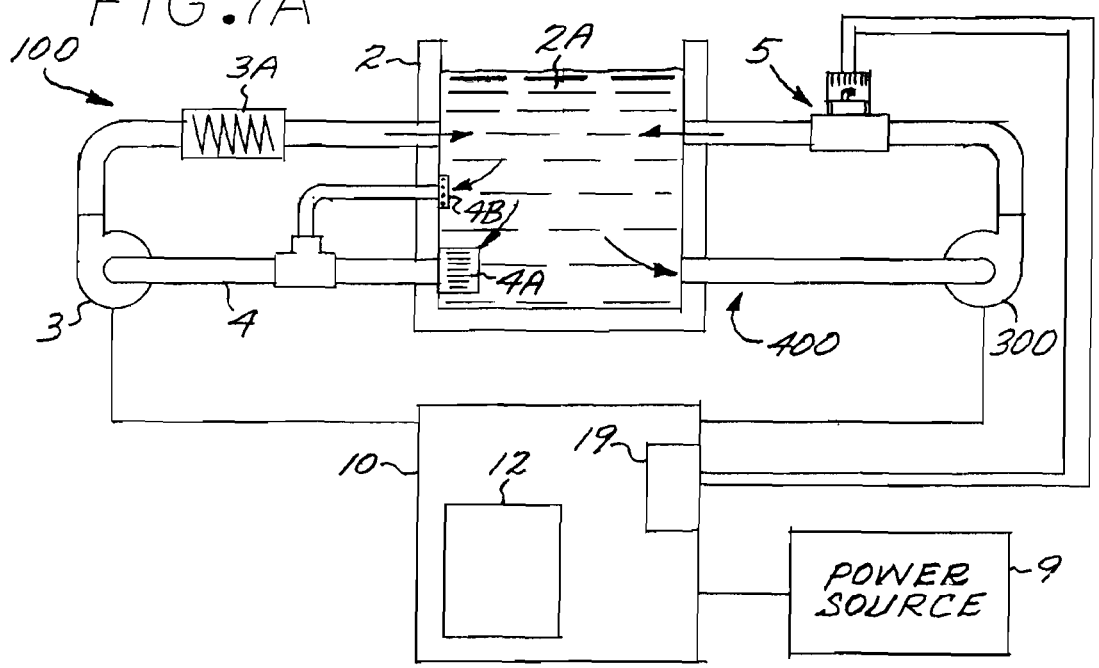
FIG. 7A illustrates an alternate exemplary embodiment of a bathing installation such as a spa or pool system.

FIG. 7A illustrates an alternate exemplary embodiment of a spa or pool system 100. In an exemplary embodiment, the electrolytic cell assembly 5 is connected in a separate recirculating water path or circuit 400. A pump 300 may be controlled by the control system 10 to recirculate water through the water path 400 and the cell 5. This permits independent control over functions provided by the cell 5, e.g. sanitizing and de-scaling functions, without requiring the heating and/or water recirculation functions provided by pump 3 to be activated. The control system 10 may include a microprocessor-based controller 12 which provides control signals and power to the electrolytic cell drive circuit 19. Alternatively, the drive circuit may be a stand alone circuit which may interact with control system 10, or may even be a stand-alone control/drive system.

Figure 8:
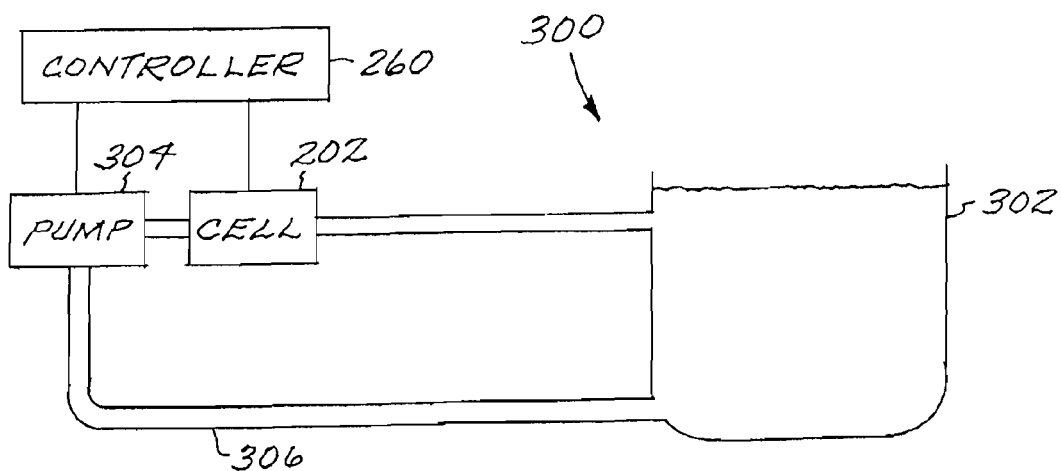
FIG. 8 is a simplified diagrammatic illustration of a water system.

FIG. 8 is a simplified diagrammatic illustration of a water system 300 with a water vessel 302, which may be a boiler, a ship's ballast, a fountain basin, a pool or spa, by way of example only. A pump 304 recirculates water from the vessel 302 through a water flow path 306. The system may include other components in the water flow path, such as a filter or a heater, for example, but for simplicity these are not shown in FIG. 8. A cell 202 is mounted in the water flow path 306. A controller 260 controls the operation of the cell 202 as well as the pump 304 in this embodiment. The cell 202 may be operated by the controller to perform sanitizing and de-scaling functions, in a manner described above regarding the embodiments of FIGS. 1-6.

Among the advantages of the integrated water treatment system exemplified in FIG. 8 is that a single cell may be operated to perform both the sanitizing and the water conditioning functions, and a single controller system may operate the cell. This may reduce cost, space requirements for multiple elements, and may improve system reliability.

Although the foregoing has been a description and illustration of specific embodiments of the invention, various modifications and changes to the subject matter can be made by persons skilled in the art without departing from the scope and spirit of the invention as defined by the following claims.

What is claimed is:

1. An integrated water treatment system for sanitizing the water in a water system and reducing scaling, comprising:
    an electrolytic cell through which water containing a dissolved electrolyte is pumped, the electrolytic cell including an electrode set comprising a plurality of flat plates, a housing supporting the electrode set and configured for mounting in a recirculating water flow path of the water system, and a water flow path portion within the housing through which water to-be-treated flows from an inlet side of the housing to an outlet side of the housing;
    an electronic control system coupled to the electrolytic cell, said system adapted to provide a drive current to the cell to generate a sanitizer by electrolysis;
    said control system further adapted to apply a time varying voltage drive to said cell to reduce scaling build-up, said time varying voltage drive having a frequency of at least 1 Hz; and
    wherein the control system is a single microprocessor-based control system adapted to provide a composite signal to the cell which is a composite of a constant current source drive and said time-varying voltage drive, and wherein the electronic control system includes a microprocessor;
    the system further comprising a DC power source providing a DC potential difference between a first node and a second node, and wherein said electronic control system comprises a plurality of solid state switches coupling the DC power source to the cell, the switches being controlled by the electronic control system, and wherein the microprocessor is adapted to execute an algorithm to control the switches to provide a variable pulse width modulated DC-to-DC constant current source function.

2. The system of claim 1, wherein said electrolytic cell generates a halogen for providing sanitizing water treatment in a body of water.

3. The system of claim 1, wherein said electronic control system is adapted to monitor the application of DC current to the cell and to adjust the current to remain substantially constant across varying water conditions or changes in the electrolyte.

4. The system of claim 1, wherein the polarity of the drive current is reversed by the control system to clean deposits or contamination from the cell.

5. The system of claim 1, wherein the time-varying voltage drive applied to the cell includes a time-varying signal waveform having cyclical alternatively positive-going and negative-going portions.

6. The system of claim 5, wherein said time-varying signal has a repetition rate between 3 KHz and 5 KHz.

7. The system of claim 5, wherein the time-varying signal has a repetition rate which is ramped or stepped from a first frequency to a second frequency in a cycle having a predetermined duration.

8. The system of claim 7, wherein the predetermined duration is about one second.

9. The system of claim 1, wherein said time varying signal varies in frequency between at least 1 Hz and an upper frequency no greater than 20 KHz.

10. The system of claim 1, wherein said control system includes a coupling capacitor for coupling said time-varying voltage drive to said cell.

11. The system of claim 1, wherein said plurality of flat plates are mounted within the cell housing in a parallel relationship.

12. The system of claim 1, wherein the water system is a bathing installation.

13. A water treatment system for treating water including a dissolved electrolyte in a water system including a pump and a water flow line, comprising:
an electrolytic cell coupled into the water flow line so that water flows through the cell when the pump is operating, the cell including a plurality of cell plates, a cell housing for supporting the plates in an aligned relationship, and first and second electrical terminals;
an electronic control system coupled to the first and second terminals of the electrolytic cell, said system adapted to provide a drive current to the cell to generate a sanitizer by electrolysis;
said electronic control system further comprising a time-varying signal generator and a coupling capacitor coupled to said first terminal of said cell, the signal generator adapted to apply an AC-coupled high frequency time varying voltage drive through said coupling capacitor to said cell to reduce scaling build-up; and
wherein said electronic control system is adapted to selectively apply a composite electrical signal to the first and second terminals of the cell comprising a superposition of said drive current and said high frequency time varying voltage; and wherein the electronic control system includes a microprocessor, the system further comprising a DC power source providing a DC potential difference between a first node and a second node, and wherein said electronic control system comprises a plurality of solid state switches coupling the DC power source to the cell, the switches being controlled by the electronic control system, and wherein the microprocessor is adapted to execute an algorithm to control the switches to provide a variable pulse width modulated DC-to-DC constant current source function.

14. The system of claim 13, wherein said electrolyte includes a halogen salt, and said electrolytic cell generates a halogen for providing sanitizing water treatment in a body of water.

15. The system of claim 13, wherein said electronic control system is adapted to monitor the application of DC current to the cell and to adjust the current to remain substantially constant across varying water conditions or changes in the electrolyte.

16. The system of claim 13, wherein the time-varying voltage drive applied to the cell includes a time-varying signal waveform having cyclical alternatively positive-going and negative-going portions.

17. The system of claim 16, wherein said time-varying signal has a repetition rate between at least 1 Hz and an upper frequency which does not exceed 20 KHz.

18. The system of claim 17, wherein the time-varying signal has a repetition rate which is ramped or stepped from a first frequency to a second frequency in a cycle having a predetermined duration.

19. The system of claim 18, wherein the predetermined duration is about one second.

20. The system of claim 13, wherein the control system is a single microprocessor-based control system.

21. The system of claim 13, wherein said plurality of plates are planar plates mounted within the cell housing in a parallel relationship.

22. The system of claim 13, wherein the control system is adapted to apply said AC-coupled high frequency time varying voltage drive only when the pump is operating.

23. The system of claim 13, wherein said plurality of plates are coated with a corrosion resistant material.

24. The system of claim 23, wherein said corrosion resistant material is rhuthenium dioxide.

25. The system of claim 13, wherein the water flow line is a recirculating water flow line, wherein water is recirculated through the water system.

26. The system of claim 13, wherein the water system is part of a bathing pool or spa installation.

* * * * *